United States Patent [19]
Jonner et al.

[11] Patent Number: 4,852,009
[45] Date of Patent: Jul. 25, 1989

[54] METHOD OF CONTROLLING BRAKING OF A VEHICLE OPERATING IN A CURVED PATH, AND VEHICLE BRAKE CONTROL SYSTEM

[75] Inventors: Wolf-Dieter Jonner, Beilstein; Heinz Leiber, Oberriexingen; Dieter Roller, Vaihingen/Enz, all of Fed. Rep. of Germany

[73] Assignee: Robert Bosch GmbH, Stuttgart, Fed. Rep. of Germany

[21] Appl. No.: 5,486

[22] Filed: Jan. 20, 1987

[30] Foreign Application Priority Data

Jan. 28, 1986 [DE] Fed. Rep. of Germany ....... 3602432

[51] Int. Cl.$^4$ .............................................. B60T 8/32
[52] U.S. Cl. ............................... 364/426.02; 303/100; 303/97
[58] Field of Search ................... 364/426.02; 180/197; 303/96, 97, 100, 106

[56] References Cited

U.S. PATENT DOCUMENTS

| | | | |
|---|---|---|---|
| 3,790,225 | 6/1974 | Wehde | 303/93 |
| 3,797,892 | 3/1974 | Leiber | 303/100 |
| 4,374,421 | 2/1983 | Leiber | 303/96 |
| 4,480,309 | 10/1984 | Burckhardt et al. | 303/96 |
| 4,484,280 | 11/1984 | Brugger et al. | 303/100 |
| 4,576,419 | 3/1986 | Leiber | 303/100 |
| 4,593,995 | 11/1986 | Leiber | 303/106 |
| 4,657,313 | 4/1987 | Fennel et al. | 303/100 |
| 4,657,314 | 4/1987 | Leiber | 303/100 |

Primary Examiner—Gary Chin
Attorney, Agent, or Firm—Frishauf, Holtz, Goodman & Woodward

[57] ABSTRACT

To counteract the tendency of over-steering when a vehicle operates in a curved path, and one of the wheels—typically the wheel at the inner side of the curve exhibits a tendency to block and, then, braking pressure is reduced to one of the front wheels only, the braking pressure applied to the rear wheel or wheels is reduced. If braking pessure is reduced to both of the front wheels, braking pressure being applied to the rear wheels is controlled, independently, in accordance with anti-brake lock control considerations, which have priority over dropping of braking pressure to prevent over-steering.

17 Claims, 3 Drawing Sheets

4,852,009

METHOD OF CONTROLLING BRAKING OF A VEHICLE OPERATING IN A CURVED PATH, AND VEHICLE BRAKE CONTROL SYSTEM

REFERENCE TO RELATED PUBLICATION

German Patent Disclosure Document DE-OS No. 34 21 700, =U.S. Pat. No. 4,593,955.

The present invention relates to a method and system to control braking of a vehicle operating in a curved path, and more particularly to a method of operating an anti-brake lock system (ABS) and an ABS having features which carry out the method.

BACKGROUND

It has previously been proposed to provide an ABS in which braking pressure applied to the front wheels is separately, individually controlled and, further, the braking pressure to the rear wheels is controlled, which is so arranged that, in case of yaw torque, the braking effort being applied to the respective wheels is reduced. In one such system—see the referenced U.S. Pat. No. 4,593,955, Leiber, to which German Patent Disclosure Document DE-OS No. 34 21 700 corresponds—the pressure rise on one front wheel is limited if the braking pressure to the other front wheel is controlled by the ABS. The control characteristics themselves are changed when operation of the vehicle in a curved path is sensed. Such sensing of the curved path can be obtained either by sensing response of a transverse accelerometer or by deriving a curved path signal by comparing speed differences between wheels operating at the inside of a curve and at the outside of a curve. The system of the referenced U.S. Pat. No. 4,593,955 also proposes to disable the yaw torque pressure decrease upon sensing a predetermined transverse acceleration, for example when the vehicle is in a curve.

Decreasing of yaw torques is used in vehicles with ABS control in order to prevent differences in braking effort on the front wheels of the vehicle to become too high if the coefficient of friction of the respective front wheel with the underlying surface or road is asymmetrical. Basically, yaw torque is decreased by limiting the pressure rise on the wheel which last indicates a tendency to block (which is referred to as the "high wheel" or the high-brake pressure wheel) if the other wheel, the "low wheel" or lower brake pressure wheel, has the tendency to block.

Various solutions for decrease of yaw torques have been known, for example to permit pressure rise on the high-brake pressure wheel upon sensing tendency to block at the low-brake pressure wheel only at a decreased rate, for example by pulsing application of pressure rise brake fluid; or to maintain pressure constant on the high-brake pressure wheel when sensing tendency to block at the low-brake pressure wheel, until pressure is again raised at the low-brake pressure wheel, and then increase the pressure, in common, at a low rate, for example by pulsing brake pressure. Possibly, a small additional pressure decrease on the high-brake pressure wheel may be commanded, for example in advance of a phase of maintaining braking pressure constant.

The yaw torque brake pressure decrease thus permits on the high-brake pressure wheel a rise in brake pressure to the maximum value only with some time delay. This results in temporal delay of the resulting yaw torque, due to the limited maximum difference in brake effort to such an extent that the driver or operator will be given sufficient reaction time to react to the driving condition. The instant of time for the temporally limited brake pressure rise on the high-brake pressure wheel is derived from instability of operation, that is, rotary operation of the low-brake pressure wheel. Similar conditions may occur at the wheels at the outside of a curve and the inside of a curve when braking is commanded and while the vehicle is operating in the curve. Recognition of braking in a curve thus cannot be derived from the operating conditions of the wheels themselves.

Many vehicles have a tendency to over-steer, which means that, as the transverse acceleration increases as the vehicle passes through a curve, with only slight deceleration of the vehicle, the vehicle will have a tendency to take the curve sharper that is, to move towards the inside of the curve. A vehicle which has an ABS without yaw torque brake decrease or limiting will be similar to one without it, that is, the tendency to over-steer will be retained if the deceleration due to braking is low. If, however, the operator commands a higher braking effort, a torque will occur at the front wheel at the outside of the curve due to the increase in braking effort thereon, which is a torque which tends to counteract the torque towards the inside of the curve, thus tending to cancel the over-steering behavior of the vehicle.

Increase of braking effort at the front wheel at the outside of the curve is time-delayed in vehicles having ABS and yaw torque brake limiting; the counteracting torque, then, will build up in most instances too late, so that the vehicle will receive a substantial torque pulse in the direction of oversteering, that is, towards the inside of the curve. In spite of desired increase of delay by braking, the behavior when braking while the vehicle is passing through a curve will be related to the behavior similar to low vehicle deceleration. The advantage of the counteracting torque thus cannot be obtained.

It has been proposed to eliminate this disadvantage by disabling the effect of the yaw torque brake limitation when the vehicle passes through a curve. This can be obtained, by disconnecting or reducing the yaw torque decrease when the vehicle is operating in a curve, that is, when operation in a curve path is being sensed.

THE INVENTION

It is an object to obtain the advantages of a counter torque tending to reduce or eliminate, i.e. reduce to zero, the oversteering behavior of a vehicle without, however, eliminating the advantages obtainable by yaw torque brake effort limitation.

Briefly, a determination is made if one of the front wheels has a tendency to block and if the vehicle operates in a curved path.

The braking pressure being applied to the rear wheels is then limited upon such determination.

The solution, in accordance with the present invention, to influence the rear wheel braking pressure when the vehicle operates in a curve is yet another solution to the problem described. This solution can be used alone, or in addition to or in combination with the previously referred to and known disconnection or reduction of the yaw torque limitation when the vehicle operates in a curve. In accordance with a feature of the invention, and when using a combined solution to the problem—in accordance with the present invention, in combination with proposed solutions of the prior art—the transverse acceleration limits are set at higher levels than they would be set or would be necessary upon pure elimination of the drop in yaw torque.

Braking pressure applied to the rear wheels can be influenced in various ways. It is possible, for example, to maintain the pressure at the rear wheel brakes at a constant level when a predetermined transverse acceleration is sensed, that is, when, the vehicle operates in a curve, and, additionally, instability of operation of one of the front wheels is determined, especially of the front wheel at the inside of a curve, for a predetermined time interval or until the predetermined transverse acceleration is no longer sensed. Another alternative is to maintain the pressure at the rear wheel brakes until a tendency to block on the high-brake pressure wheel is determined. The ABS can be so arranged that it provides for a phase of constant brake pressure; such a phase can be modified by permitting slight decrease of braking pressure being applied to the rear wheel brakes, for example for a predetermined time interval. This is also applicable if the transverse acceleration occurs only while the braking pressure is controlled by the ABS. A priority should be provided, in both cases, for a pressure decrease, demanded by the ABS controller upon sensing a tendency of the rear wheels to block, in advance of, or in priority of maintaining braking pressure constant.

It is also possible to limit pressure rise on the rear wheel brakes, preferably by making the rate of pressure rise dependent on transverse acceleration such that the slope or rate of pressure rise increases as transverse acceleration decreases. A predetermined maximum value of transverse acceleration, which occurs, for example, at a maximum possible curve speed, may be associated with a pressure rise rate of zero.

DRAWINGS

DETAILED DESCRIPTION

Figure 1:
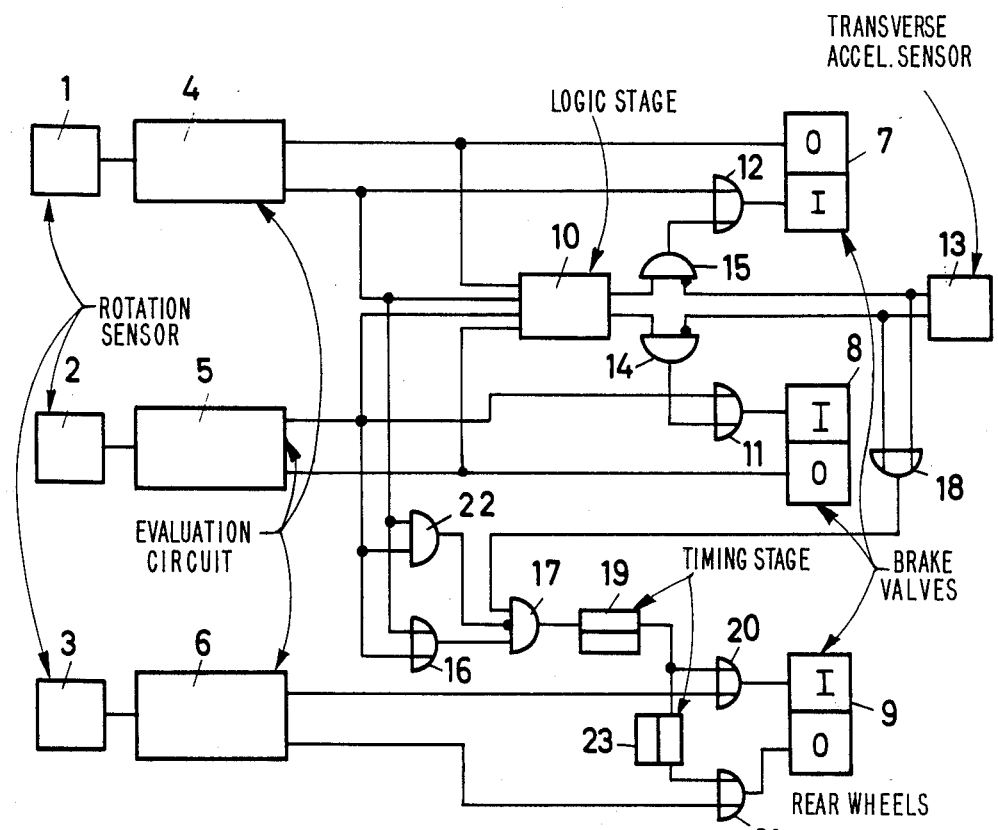
FIG. 1 is a schematic block circuit diagram of a first system embodiment of the present invention.

The vehicle has a rotation sensor 1 coupled to the left front wheel, and a rotation sensor 2 coupled to the right front wheel. A further rotation sensor 3 is provided which is coupled to sense the average speed of rotation of the rear wheels, for example by being coupled to the main drive of a differential; rather than using a single sensor 3, two separate sensors associated with the two rear wheels may be used which, for example, can be operated in "select low" mode of operation. Evaluation circuits 4, 5, 6 are coupled to the respective sensors 1, 2, 3 to process the sensor signals and to provide, at their outputs, brake control signals to respective brake control valves 7, 8, 9, each of which has an inlet valve section, schematically shown at I, and an outlet or drain valve section, schematically shown at O, and, selectively, permitting admission of pressurized brake fluid, drainage of pressurized brake fluid, or blockage of exchange of pressurized brake fluid from a brake cylinder to the inlet and outlet lines of a brake system, respectively.

Figure 3:
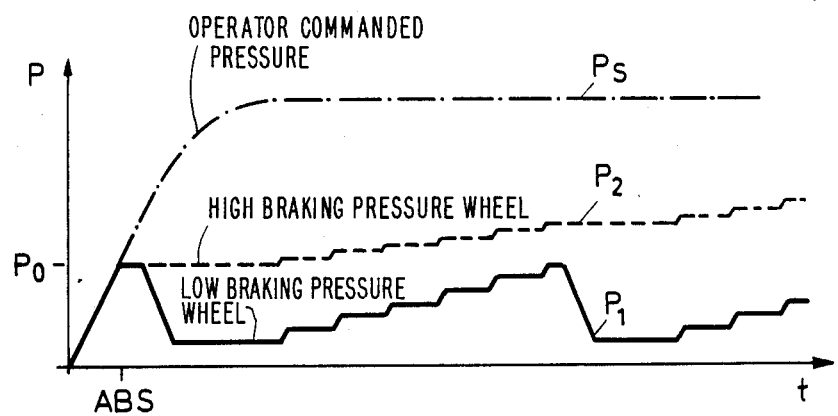
FIGS. 3, 4, 5 and 6 are pressure vs. time diagrams illustrating the course of pressure vs. time occurring at the brakes of the vehicle.

The system illustrated includes yaw torque limitation, utilized to control braking pressure at the front wheel. A logic stage 10 receives output signals from the evaluation circuits 4, 5 and so logically evaluates the respective output signals that, when one of the front wheels, for example as recognized by the evaluation circuit 4, shows that there is a tendency of the respective wheel to block, the other control channel which includes the valve 8 will be controlled such that the inlet valve element I will receive brake pressure limitation signals. These signals are applied over an OR-gate 11. The logic circuit is so arranged that, when a signal is applied to the inlet section I of valve 7, associated with the wheel of sensor 1, a signal results so that the pressure at the other wheel is maintained constant or even. Only upon occurrence of pulsed output signals being applied to the inlet valve I of the brake unit 7, resulting in pulsed increase of pressure, will increase of pressure be permitted to be applied via the inlet valve I of the brake control valve 8, likewise by pulsed pressure. This operation is illustrated in FIG. 3. The pressure commanded by the operator is shown in the chain-dotted line PS, the pressure P1, shown in solid line, is the pressure at the low-brake pressure wheel, and the pressure shown in broken line P2 is the pressure which occurs at the high-brake pressure wheel. If the pressure maintenance phase, after a decrease of pressure, extends over too long an interval, that is, longer than a predetermined time interval, it is also possible to generate pressure increase pulses for the wheel associated with the sensor 2, see the referenced U.S. Pat. No. 4,593,955.

Corresponding similar pressure curves will also occur when the evaluation circuit 5 senses a tendency of the wheel associated with sensor 2 to block, to then limit a pressure increase at the wheel. FIG. 1, additionally, illustrates a transverse acceleration sensor 13 which has an output coupled to two AND-gates 14, 15, each with an inverting input. When the acceleration sensor 13 provides an output signal to one of its outputs—in dependence on the direction of transverse acceleration, the respective AND-gate 14, 15 will be blocked by the respective inverting input. Consequently, upon operation in a curve, the pressure limitation at the outer wheel in the curve becomes ineffective since, in general, the wheel at the inside of the curve first has a tendency to block.

Figure 4:
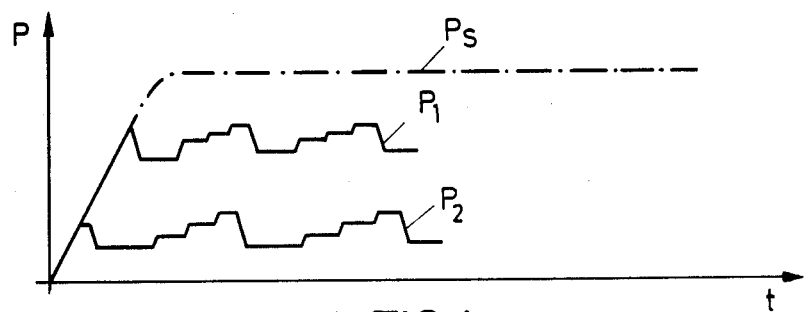

The braking pressures on the wheel brakes, thus, are controlled independently of each other. This condition is shown in FIG. 4, in which it is assumed that, as soon as the ABS, that is, in FIG. 1 the evaluation circuits 4, 5, 6 have responded, the vehicle began to operate in curved path.

In accordance with a feature of the invention, the braking pressure at the rear wheels is additionally affected when the vehicle operates in a curve. Influencing the rear wheel braking pressure can be obtained without disconnecting the yaw torque limitation, as above described.

In accordance with a feature of the invention, an OR-gate 16 is provided which receives control signals for the inlet valve portions I of the brake control valves 7 and 8. The output of the OR-gate 16 is connected to an AND-gate 17. A second input of AND-gate 17 is derived from the output of a further OR-gate 18 which is connected to the two outputs of the transverse acceleration sensor 13. A third, inverting input of AND-gate 17 is connected to the output of a further AND-gate 22, the inputs of which are connected to the control lines for the respective inlet valve sections or portions I of the brake control valves 7 and 8.

OPERATION

AND-gate 17 provides a signal when:

(1) a transverse acceleration of a predetermined level is present; and (2) one only of the inlet valve sections I of the control valves 7, 8 is commanded to permit brake pressure to be applied.

Figure 5:
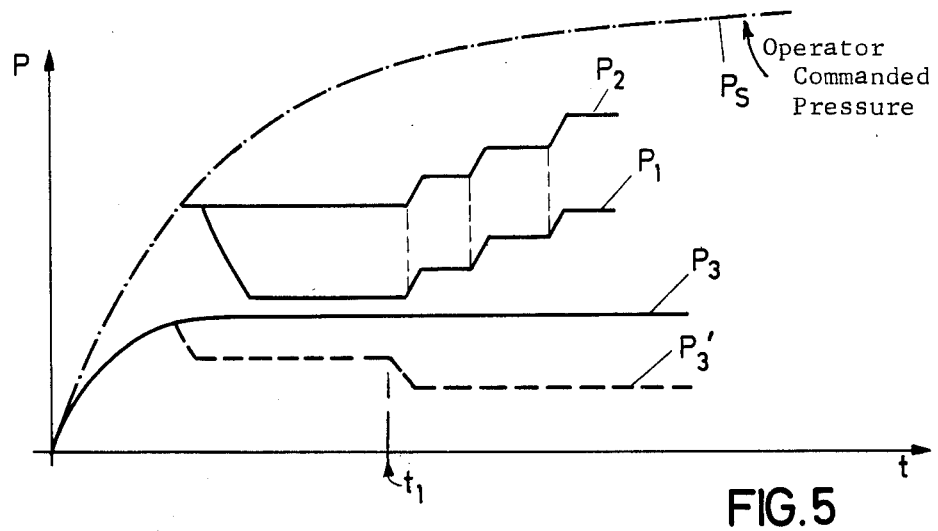

The output signal from the AND-gate 17 may directly be applied to the inlet section I of the rear wheel brake valve or control unit 9. The output signal from the AND-gate 17 is then coupled via OR-gate 20 directly to the inlet valve section I of the rear wheel brake control unit or valve 9. In the arrangement shown, the brake pressure at the rear wheels would be maintained constant when:

(1) transverse acceleration is present, and (2) one only of the front wheels has a tendency to block. This condition is shown in FIG. 5, in which the solid-line curve $P_3$ shows the course of the rear wheel brake pressure. In accordance with a feature of the invention, a timing element 23, for example a monostable flip-flop (FF) and an OR-gate, can be provided, connected to the drain portion O of rear wheel brake valve unit 9. The constant pressure maintenance phase of the brake pressure can thus be changed by first providing for a short drop in braking pressure, corresponding to the time constant of the timing circuit 23. This is shown in FIG. 5 in the broken line $P_3'$. It should be noted that priority is provided from the instant of time at which control of the rear wheel brake starts, at time $t_1$. A pressure decrease commanded by this priority has priority level before the constant brake pressure maintenance phase.

Rather than terminating control of pressure at the rear wheels when the transverse acceleration signal disappears, or upon start of control of braking pressure at the two front wheels, additionally, a further timing circuit, formed for example by a monostable FF 19, can be provided which is SET upon occurrence of an output signal from the AND-gate 17 and then, by a timing interval, determines the constant braking pressure phase for the inlet valve I of the rear wheel brake valve unit 9.

Figure 2:
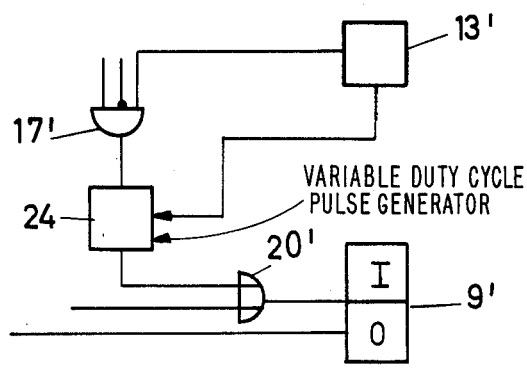
FIG. 2 is a fragmentary detail circuit for an alternative to control pressure at the rear wheels, the remainder of the system being similar to that shown in FIG. 1.

The fragmentary detailed circuit of FIG. 2 merely shows a portion of the system of FIG. 1. Similar elements have been given similar reference numerals, with prime notation. Thus, AND-gate 17' corresponds to AND-gate 17, OR-gate 20' to OR-gate 20 and transverse acceleration sensor 13 and rear wheel brake valve control unit 9 to the blocks 13', 9' of FIG. 2, respectively.

Figure 6:
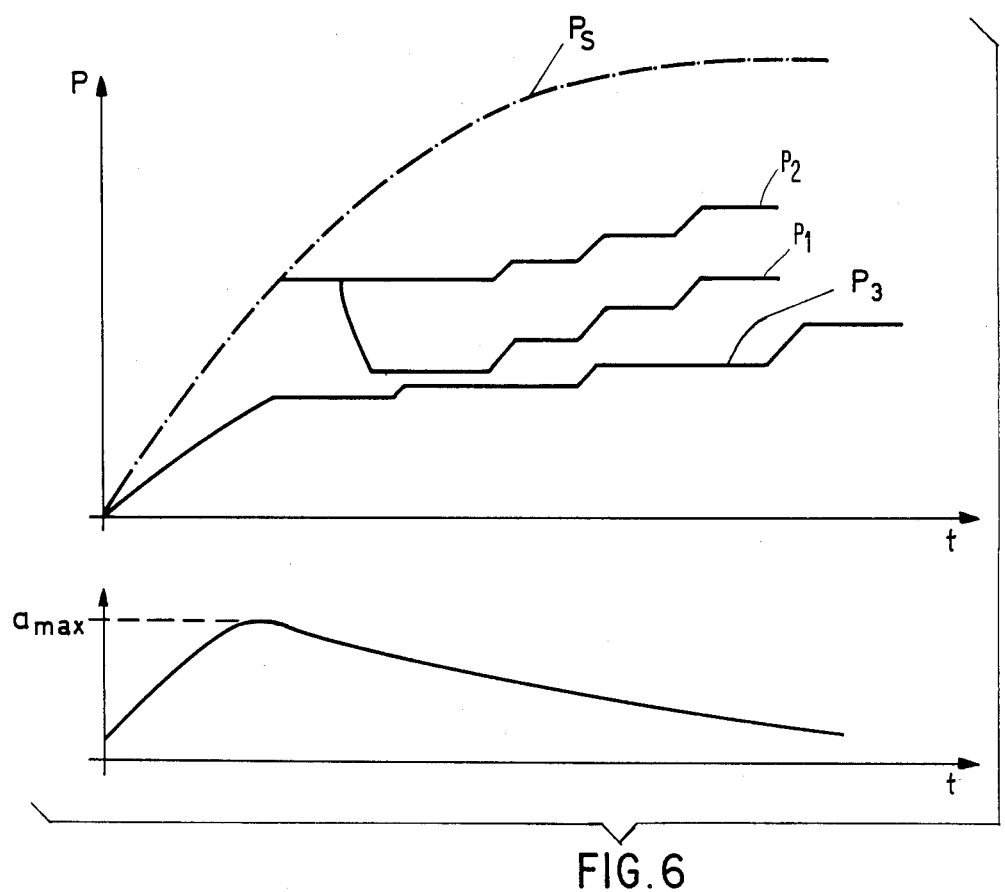

If a transverse acceleration of predetermined level is present, and only one of the front wheels shows a tendency to block, AND-gate 17' enables a pulse generator 24, the duty cycle or pulse-pause relationship of which depends on an applied transverse acceleration signal in such a manner that, close to a maximum possible transverse acceleration value $a_{max}$, the pulse-pause relationship is infinity—in other words, maintaining constant braking pressure. As the transverse acceleration decreases below the maximum value $a_{max}$, the pulse-pause proportion becomes smaller, so that the pressure, with decreasing transverse acceleration, increases with an increasing gradiant, as shown in FIG. 6, which, to the same time scale, shows the respective braking pressures and the transverse acceleration, including transverse acceleration $a_{max}$ FIG. 5, in the broken line, thus shows the effect of the operation of the system, and in accordance with the method, by first dropping the braking pressure applied to the rear wheels—see broken curve $P_3$; if desired, the additional timing stage 19 delays the application of this additional drop in braking pressure. The connection from evaluation circuit 6 through OR-gate 20, 21 provides for priority of control by the evaluation circuit 6

The invention has been illustrated in connection with circuit diagrams of FIGS. 1 and 2; it is to be understood that similar results can be obtained by suitably programming an existing ABS in which, already, a transverse acceleration sensor such as sensor 13 or 13' is present. Thus, although illustrated in connection with FIG. 1, an equivalent "software" or "firmware" solution can be obtained.

We claim:

1. In an anti-brake lock system (ABS) for a vehicle, controlling application of braking pressure individually to each of the front wheels and to the rear wheels of the vehicle,
   a method of controlling braking pressure being applied to the wheels comprising the combination of the steps of;
   determining if the vehicle moves in a curved path and deriving a curved path signal;
   controlling braking pressure of a first one of the front wheels upon determining in the ABS that said first front wheel has a tendency to block or becomes subject to unstable behavior;
   controlling rise in braking pressure at a second front wheel to a predetermined reduced level to thereby decrease yaw torque; and
   limiting the braking pressure being applied to the rear wheels as a function of the determination of tendency to block or unstable behavior of said one front wheel if also the curved path signal indicates movement of the vehicle in the curved path.

2. The method of claim 1, wherein said braking pressure limiting step comprises maintaining the braking pressure at the rear wheels essentially constant.

3. The method of claim 2, including the step of lowering the braking pressure being applied to the rear wheels for a predetermined time in advance of maintaining said rear wheels braking pressure constant.

4. The method of claim 2, including the step of lowering the braking pressure being applied to the rear wheels to a predetermined extent in advance of maintaining said braking pressure constant.

5. The method of claim 3, including the step of lowering the braking pressure being applied to the rear wheels to a predetermined extent in advance of maintaining said braking pressure constant.

6. The method of claim 2, including the step of additionally decreasing braking pressure being applied to the rear wheels based on a priority braking pressure decrease commanded by the anti-brake lock system.

7. The method of claim 1, wherein said step of limiting the braking pressure being applied to the rear wheels comprises controlling rise of the braking pressure being applied to the rear wheels to a limited level.

8. The method of claim 7, including the step of lowering the braking pressure being applied to the rear wheels for a predetermined time in advance of said limited level pressure rise.

9. The method of claim 7, including the step of lowering the braking pressure being applied to the rear wheels by a predetermined extent in advance of said limited level pressure.

10. The method of claim 8, including the step of lowering the braking pressure being applied to the rear wheels by a predetermined extent in advance of said limited level pressure rise.

11. The method of claim 7, including the step of controlling the braking pressure level during said limited pressure rise under control of the anti-brake lock system.

12. The method of claim 7, including the step of
sensing the level of the curved path signal to determine the extent of transverse acceleration of the vehicle;
and controlling the limited level pressure rise as an inverse function of the extent of transverse acceleration to permit a higher pressure level rise as the transverse acceleration decreases.

13. The method of claim 12, including the step of maintaining the braking pressure at a constant level when a predetermined transverse acceleration is sensed.

14. The method of claim 1, including the step of reducing or suppressing limitation of rise in braking pressure level at the second front wheel if movement of the vehicle in the curved path is determined.

15. The method of claim 14, including the step of reducing or suppressing said limitation of rise in braking pressure level at the second front wheel at relatively high transverse acceleration levels.

16. Anti-brake lock system for a vehicle subject to yaw torque and with reduced tendency to oversteering comprising:
means (13) for providing vehicle transverse acceleration signals;
means (1-6), for controlling braking pressure applied to each of the front wheels, independently, and to the rear wheels of the vehicle for preventing locking of any of the wheels;
means (10, 11-15) coupled to and responsive to said braking pressure control means for additionally controlling braking pressure applied to a first one of the front wheels and upon a determination that said first front wheel has a tendency to block or become subject to unstable behavior,
said additional braking pressure control means further controlling rise in braking pressure applied to a second one of the front wheels to a predetermined reduced level upon determining of presence of said transverse acceleration signals, and while braking pressure is applied to said second front wheel under control of said additional braking pressure control means;
rear wheel braking pressure limiting means (9, 20, 21, 23) for limiting the braking pressure being applied to the rear wheels coupled to said braking pressure control means (1-6); and
means (16, 17, 18, 22) coupled to receive said vehicle transverse acceleration signals and further coupled to said rear wheel pressure limiting means for controlling said rear wheel pressure limiting means as a function of the determination of the tendency to block or unstable behavior of said one of said front wheels and while the transverse acceleration signals are present.

17. The system of claim 16,
wherein said brake pressure control means for the rear wheels comprises an evaluation circuit (6) sensing operation of the rear wheel or wheels, and controlling, respectively, supply of pressurized brake fluid, maintenance of pressure of the pressurized brake fluid or drainage of pressurized brake fluid from a valve unit means (9) coupled to the rear wheel or wheels;
and wherein signals from said rear wheel evaluation circuit applied to said valve unit means, tending to decrease brake pressure being applied to the rear wheel or wheels, have priority over signals derived from said braking pressure limiting means.

* * * * *